Nov. 7, 1933.     H. T. F. LUNDBERG ET AL     1,934,079
ELECTRICAL PROSPECTING
Filed Feb. 15, 1932     4 Sheets-Sheet 1
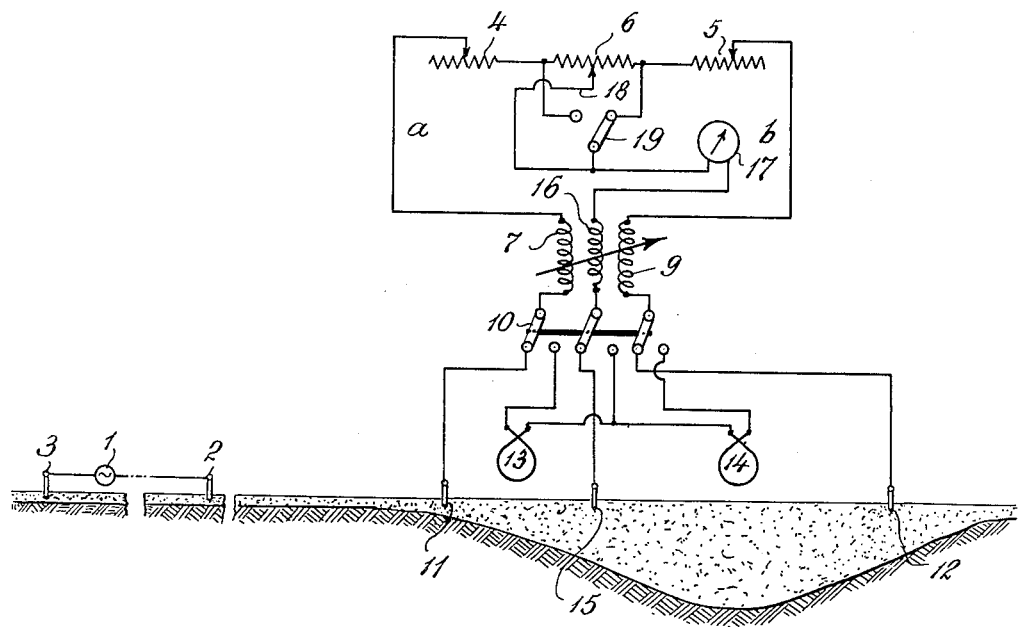
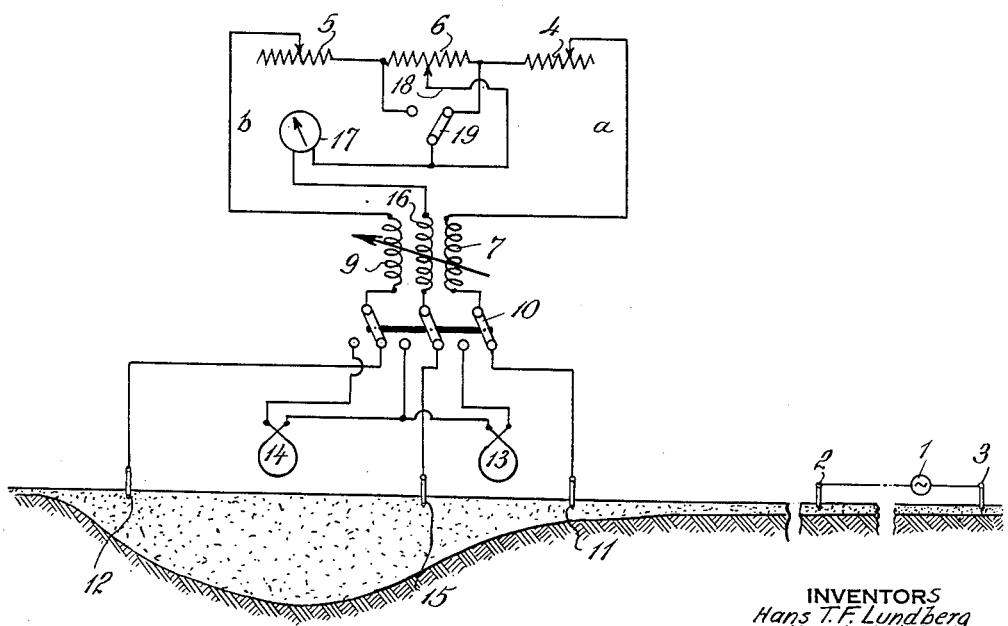
INVENTORS
Hans T. F. Lundberg
Folke H. Kihlstedt,
BY
ATTORNEYS

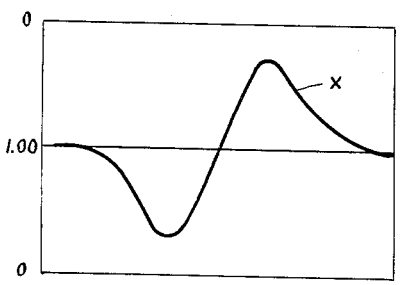
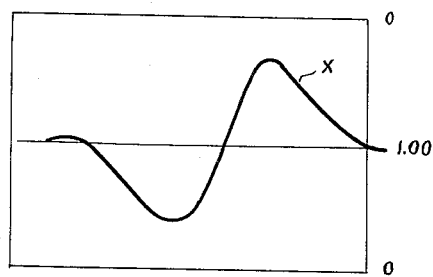
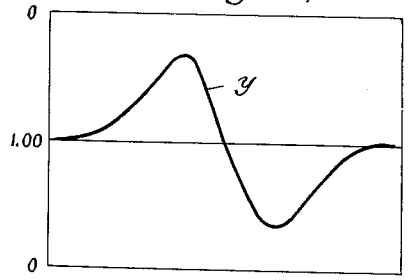
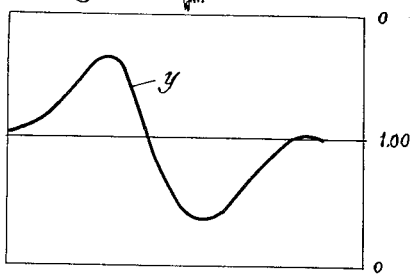
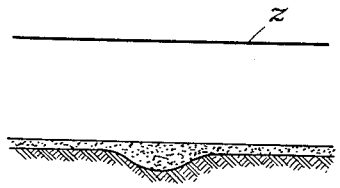
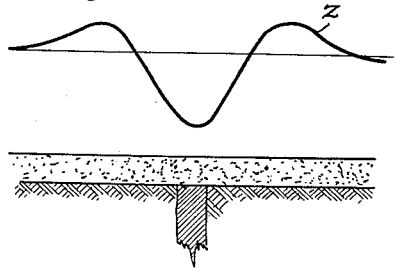

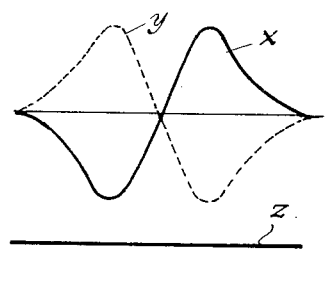
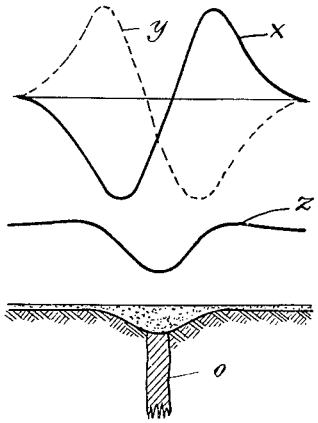
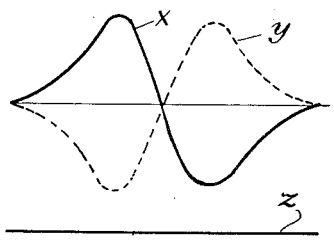
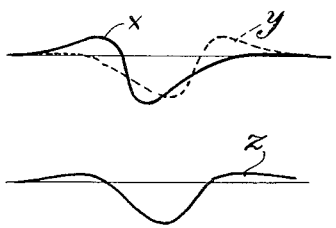
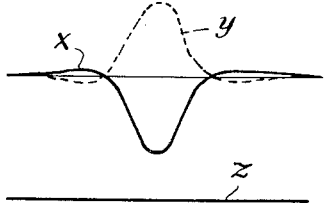
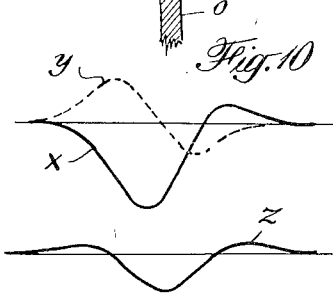

Nov. 7, 1933.  H. T. F. LUNDBERG ET AL  1,934,079
ELECTRICAL PROSPECTING
Filed Feb. 15, 1932    4 Sheets-Sheet 4
Fig. 11.
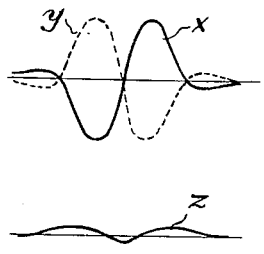
Fig. 12.
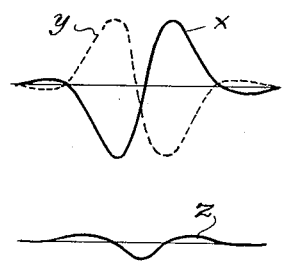
Fig. 13.
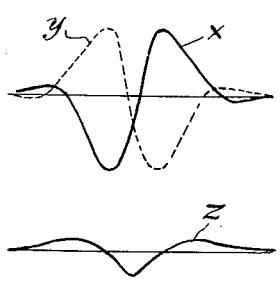
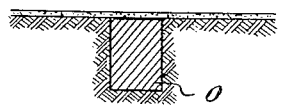
Fig. 14.
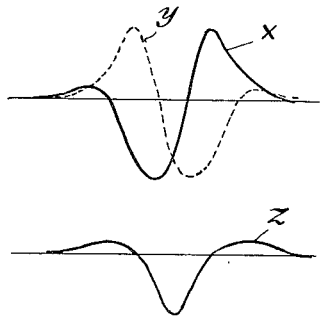
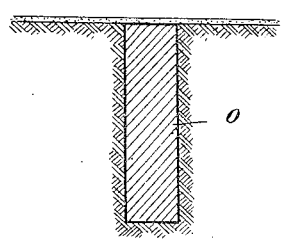
INVENTORS
Hans T. F. Lundberg
Folke H. Kihlstedt.,
BY
Pennie, Davis, Marvin & Edmonds
ATTORNEYS Patented Nov. 7, 1933

1,934,079

UNITED STATES PATENT OFFICE 1,934,079

ELECTRICAL PROSPECTING

Hans T. F. Lundberg and Folke H. Kihlstedt, Massapequa, N. Y., assignors to Swedish American Prospecting Corporation, New York, N. Y., a corporation of New York Application February 15, 1932. Serial No. 592,986

6 Claims. (Cl. 175—182)

This invention relates to electrical geo-physical prospecting and has for its object certain improvements in the method of electrical prospecting. The invention relates more particularly to an improved method for determining and comparing electrical potential or electro-magnetic field strengths, such as are encountered when investigating artificial electric ground fields set up for the purpose of making geo-physical explorations in a tract to be investigated.

The methods heretofore used for studying the subsoil in order to locate valuable mineral deposits are either qualitative methods, rendering only very general information, or, if quantitative methods, they involve considerable mathematical preparation of the results, as well as of standard charts and diagrams. And still, in only extremely few simple cases is it possible to determine more than the horizontal extension of the object searched for. Further, a great difficulty in interpreting the results of such quantitative methods is encountered from disturbances originating at or near the surface and caused by irregular topography, uneven distribution of overburden, etc. It is often found that such a surface irregularity completely hides an ore body, which thus is passed over unnoticed and, on the other hand, a surface disturbance may be mistaken as being caused by an ore body and result in useless exploration work, in order to find, by trenching or diamond drilling, an indicated ore body which in reality does not exist.

Using the present invention, it will be possible to determine not only the horizontal dimensions of the object sought, but also it's vertical extesion. Further, it will be possible to eliminate completely surface disturbances so that an ore body searched for will, under all circumstances, be indicated.

The method of the invention is based upon the fact that when an area under investigation is flooded with current from one side of the area, local conductivity anomalies in the ground will cause disturbances that are symmetrical with regard to the position of the anomaly when the anomaly is shallow or occurs at the surface only, but that are unsymmetrical when the anomaly is deep-seated or extends to great depth. This difference cannot be determined or measured when the profile is surveedy in one direction. Only by surveying the profiles at least twice, flooding the area with currents from opposite sides, can the symmetry of the first type and the unsymmetry of the second type be revealed.

The procedure thus involves the laying out of a cable connecting at least two grounded power electrodes supplied with electric current, and then measuring the potential, the potential drop, or the potential drop ratio along a profile staked out from one of the power electrodes; the other power electrode being placed far away on the other side of the first power electrode, taken from the profile staked out. The first power electrode may be kept stationary or moved along on the profile as the survey proceeds. This power electrode, however, is placed at a point removed from the profile being plotted, so that current received in a compensating net-work, for example, in potential electrodes, directly over the profile is not affected by conductivity variations vertically below the power electrode.

In a preferred present practice of the invention, potential or field strength ratios are determined across a profile of the tract under investigation. For this purpose, an artificial electric or electro-magnetic ground field is created in a tract of land, and the ratio between the electric potentials or the electro-magnetic field strengths created by such ground field at spaced points in the tract are determined. This determination of the ratio between the potentials or electro-magnetic field strengths is determined in such a manner as to eliminate the resistance of ground electrodes, or other pick-up means.

The potential or field strength ratios are conveniently determined (see Theodor Zuschlag's copending applications Serial Nos. 367,541, filed May 31, 1929; 367,542, filed May 31, 1929; 469,833 filed July 22, 1930; 469,834, filed July 22, 1930; 485,638, filed October 1, 1930; 485,639, filed October 1, 1930; 516,143, filed February 16, 1931 and 526,748, filed March 31, 1931) from the flow of current produced in a conductive net-work, including suitable variable resistances and inductances and current responsive means, the potential or field strengths at the point under investigation being impressed on the net-work through suitable pick-up means, such as potential electrodes conductively grounded in the tract, or receiving coils inductively associated with the tract.

In further explanation of the invention, reference should be made to the accompanying drawing drawings, taken in conjunction with the following description, in which:

Fig. 1 is a diagrammatic representation of apparatus illustrative of a practice of the invention in which a profile of a tract under investigation is flooded with current supplied from one side;

Fig. 2 is a diagrammatic representation of the apparatus of Fig. 1 to illustrate its use when the profile is flooded with current from the opposite side of the tract;

Fig. 3 (a, b and c) shows diagrammatic curves illustrative of potential drop ratios determined when investigating an erosion valley in bed rock filled wtih drift, as further illustrated in Figs. 1 and 2;

Fig. 4 (a, b and c) illustrate similar curves when investigating an ore body below a homogeneous over-burden;

Fig. 5 is a diagrammatic composite illustration of similar curves when plotting an erosion valley according to Figs. 1, 2 and 3;

Figs. 6 and 7 illustrate a practice of the invention with common irregularities of the earth's over-burden;

Figs. 8, 9 and 10 illustrate a practice of the invention with the investigation of an ore body in combination with the three forms of common irregularities of the earth's over-burden shown in Figs. 5, 6 and 7; and Figs. 11, 12, 13 and 14 illustrate a practice of the invention in determining the vertical extent of an ore body.

Referring to Figs. 1 and 2, a suitable current source 1 is connected to grounded power or exciter electrodes 2 and 3, which may be separated several hundred or thousand feet. This arrangement is adapted to set up the necessary ground field.

The field excitation arrangement is used in conjunction with a compensating or neutralizing network consisting of non-inductive variable resistances 4, 5 and 6 connected in series with each other and with stators 7 and 8 of a variometer 9. The free ends of the stators are connected by means of a triple-pole double-throw switch 10 either to spaced and grounded potential electrodes 11 and 12, or to the free ends of pick-up coils 13 and 14,—consisting of the same number of turns of insulated copper wire, which are preferably placed within the influence of only one of the power or exciter electrodes.

The triple-pole double-throw switch further connects a center potential electrode 15, or the common ends of the pick-up coils, to the rotor 16 of the variometer. The rotor is connected in series with a zero current indicator, galvanometer or telephone 17 and a sliding contact arm 18 operating on resistance 6; either end of which resistance may be connected to the sliding contact arm by means of a single-pole double-throw switch 19.

It will be noted that the net-work employed comprises two parallel circuits a and b, the circuit a including the variable resistance 4; and the circuit b including the variable resistance 5. The current responsive device 17 is included in the branch common to the two circuits, and the resistance 6 may be included in either of the circuits, depending upon the position of the switch 19. The resistance 6 is essentially an auxiliary resistance to increase resistance 4 or 5.

During the investigation of a section of the tract, the potential drop between the electrodes 11 and 15 causes the flow of current in the circuit a; and the potential drop between the electrodes 15 and 12 causes the flow of current in the circuit b. By properly adjusting the resistance 6 and the variometer 9, the resistances of the circuits a and b may be so balanced that the same current flows in both of these circuits; in other words, the current has the same strength and the same direction, and no current flows in the common branch in which the instrument 17 is located. When this balanced condition is obtained, the ratio between the values of the resistances 4 and 5 are indicative of the ratio between the ground potentials under investigation as hereinafter more fully explained.

The distances between the electrodes 2 and 11, 11 and 15, 15 and 12, and the distance between the pick-up coils 13 and 14 may be chosen arbitrarily. In the present preferred practice of the invention the electrodes and the pick-up coils are kept in fixed relation to one another.

In order to make a potential drop ratio determination for the potential drops between electrodes 11 and 15 and between electrodes 15 and 12, which may for convenience be designated as $V_{11-15}$ and $V_{15-12}$, the potential electrodes 11, 15 and 12 are connected to the compensating network by means of the triple-pole double-throw switch 10, as shown. If the resistances 4 and 5 are set at arbitrary values, a noticeable deviation of the zero indicator 17 is generally produced. This deviation may be neutralized by appropriate manipulation of the sliding contact arm 18 of the variable resistance 6, the single-pole double-throw switch 19, and the rotor 16.

Undesirable instrument resistances and the like are eliminated by making two separate determinations of the potential or field strength ratios for each setting of the pick-up means, and by altering known variable resistances in the network to give a different value of current therethrough for each of these determinations. When the potential or field strength ratios are calculated from the data obtained by these two determinations, factors such as ground electrode resistance, receiving coil impedance, instrument resistance, and ground field variation may be eliminated and an accurate derivation of the desired ratios obtained. Since the ground resistances, receiving coil impedance instrument resistance and ground field strength do not always remain constant at different locations of the pick-up means, the elimination of these factors from the ratio determinations is essential if the results obtained at different settings are to be properly co-related and relatively analyzed.

The practice of the invention will be better understood if reference is made to the types of geophysical prospecting investigations more particularly illustrated in Figs. 3–14 inclusive. The procedure will be described only for the case of potential drop ratio measurements, although it is to be understood that other potential surveys may be treated in substantially the same manner.

The potential drop ratio or measurement obtained at each point across a profile under investigation is first divided by the normal ratio that would be obtained for substantially homogeneous ground. This normal ratio depends upon the distance from the potential electrodes, or rods, used for determining the potential drop ratio, to the closest grounded power electrode, and may then be calculated for any location. If the ground is homogeneous, the ratio, thus corrected, may be given an arbitrary numerical value of 1.00. If variations in electrical conductivity occur in the vicinity of the point surveyed, such as ore bodies, dykes, veins, or contacts, etc., or irregular position or thickness of the over-burden, then the corrected ratio will be higher or lower than 1.00, as the case may be. In order to place the data obtained in useful form, it is desirable to plot the potential ratio drop curves with reference to some such standard value.

Referring for the moment more particularly to Fig. 3a and Fig. 1 (in which the profile under investigation, an erosion valley, is flooded with a current of electricity from the left, as indicated), the potential drop ratios below 1.00 are plotted according to their numerical value (from 0 to 1.00). Ratios above 1.00 are inversed, and this inverse value is plotted down from an 0-line above the 1.00-line. In this way, the scale is the same both for high and low potential drop ratios, and a curve $x$ is plotted to indicate potential drop ratios across the profile.

The same procedure is followed when the profile of the erosion-valley is flooded with a current of electricity from the right, as more particularly indicated in Figs. 3b and Fig. 2. The potential drop ratios determined from point to point are plotted, as indicated in the preceding paragraph, to form a curve $y$. An inspection will show that the two potential drop ratio curves $x$ and $y$ of the profile now appear more or less as images of one another.

Giving the potential drop ratios above 1.00 a plus value, and the potential drop ratios below 1.00 a minus value, and adding up each juxtaposed pair of potential drop ratios for each selected point on the curves, a new curve $z$ is obtained that may conveniently be called a resultant or symmetry curve. The interpretation of the potential drop ratio determinations is then based upon this resultant or symmetry curve, since it contains nothing but a reaction of the influence from deep-seated or deeply extending features; over-burden surface disturbances being substantially completely eliminated. In the instant case, the resultant or symmetry curve $z$ is a substantially straight line, and it indicates the absence of an ore body within or adjacent to the erosion valley.

Substantially the same procedure is followed in preparing the plotted curve illustrated in Figs. 4a, 4b, and 4c. Sufficient differences exist in respect to the potential drop ratios for corresponding points on the curves $x$ and $y$, so that the resultant or symmetry curve $z$ is not a straight line; but indicates a substantial dip that in turn indicates the probable presence of an ore body in the profile at that particular and corresponding part of the curve.

In Figs. 5 to 14, inclusive, the plotted curves for various types of geophysical investigation are more closely composited. Thus, potential drop ratio curves $x$ and $y$ are drawn with respect to the same reference line to which is assigned a numerical value 1.00. Fig. 5, it will be noted, shows another method of illustrating the curves set out in Figs. 3a, 3b and 3c. The resultant or symmetry curve $z$ is shown as a substantially straight line, which indicates that there are no deep-seated or deeply extending ore features in or below the erosion valley.

Substantially the same effect is noted in interpreting the curves set out in Fig. 6, involving the investigation of a protruding ridge as compared to the valley discussed in the preceding paragraph. Here again, on adding the curves $x$ and $y$ a resultant or symmetry curve $z$ is obtained that is substantially a straight line; thus indicating the absence of an ore body.

Much the same situation obtains in the investigation diagrammatically illustrated in Fig. 7, involving a different form of earth manifestation, somewhat in the nature of a step-fault. As in the case of Figs. 5 and 6, the resultant or symmetry curve $z$ is a substantially straight line, again indicating the absence of an ore body.

A different situation is to be observed, however, on studying Fig. 8. In this case, an adding of the potential drop ratio curves $x$ and $y$ yields an irregular resultant or symmetry curve $z$, with a marked dip or valley. Although the investigation is conducted across a profile of an erosion valley, such as shown in Fig. 5, the pronounced dip in the curve $z$ indicates the presence of an ore body. A study of the potential ratio drop curve $x$ of and by itself would not necessarily indicate the presence or location of this ore body. The same is true with respect to the potential ratio drop curve $y$. On adding the two curves, however, in accordance with the present invention, the resultant or symmetry curve $z$ at once indicates the presence of the ore body; as well as its probable depth.

Figs. 9 and 10 illustrate the presence of an ore body in substantially the same manner, although the overburden is substantially different than in the case of the practice shown in Fig. 8. An adding of the potential drop ratio curves $x$ and $y$, of Fig. 9, yields a resultant or symmetry curve $z$ with a pronounced dip, directly across the ore body. The potential drop ratio curves $x$ and $y$ of Fig. 10 are different in outline, due to a difference in the nature of the over-burden, but when they are added a resultant or symmetry curve is obtained that looks substantially like the corresponding curve of Fig. 9; the pronounced dip indicating the presence and location of the ore body 0.

It has heretofore been considered extremely difficult, if not impossible, to obtain a determination of the vertical extent of an ore body. The manner in which the vertical extent of an ore body may affect a resultant or symmetry curve is illustrated in Figs. 11 to 14, inclusive. Four different ore bodies with the same width but different vertical heights give characteristic, different, minima of the resultant or symmetry curve. The size of the minimum is governed by the vertical extent of the ore body, and thus the resultant or symmetry curve facilitates the determination of its dimensions. Thus, in Fig. 11, the ore body is shallow. Its shallowness is indicated by the relatively small dip in the resultant or symmetry curve $z$. A somewhat deeper ore body is shown in Fig. 12, and, as is now to be expected, the dip in the resultant or symmetry curve $z$ is deeper than the corresponding dip in the curve $z$ of Fig. 11. The ore body illustrated in Fig. 13 is still deeper, but not as deep as the one shown in Fig. 14. An inspection of the respective resultant or symmetry curves $z$ indicates that the dips in these curves vary in amount. The larger ore body 0 of Fig. 14 causing a larger dip than the ore body of Fig. 13.

It should, therefore, be clear that the procedure of the present invention permits the location of an ore body. The probable vertical extent of the ore body may likewise be appropriately estimated. This is considered to be an important contribution to the art of geophysical prospecting according to potential methods.

Great difficulties are encountered in all potential methods of electrical prospecting due to the often complete shielding effect of economically valueless features in the over-burden, or close to the surface of a tract under investigation. The method of the present invention is particularly useful in eliminating these surface influences. Every profile should be surveyed at least twice with a different arrangement of the power electrodes, as the potential electrodes or equivalent pick-up devices are moved from point to point across a profile of the tract under study to make the necessary measurements. The power electrodes are first both placed on one side of the profile, one of the power electrodes being relatively far away while the other power electrode is at least sufficiently removed from the potential electrodes, or other pick-up means moved across the profile, to prevent inaccuracies due to the presence vertically below this power electrode of conductive bodies that will cause undue variations in the current received in the pick-up means. After the profile has been thus surveyed, the power electrodes are moved to the opposite side of the profile; and the profile is re-surveyed with this new power electrode arrangement. It will thus be seen that the profile is flooded with current first from one side and then from its opposite side, while the determinations with the potential pick-up means are repeated.

The two series of potential drop ratios are plotted, after certain corrections, so that the scales are uniform above and below a given normal. A resultant or symmetry curve is then constructed by adding the two series of ratios together, as they are represented by the first two ratio curves.

All interpretations of the profile may then be based on this resultant or symmetry curve, which is free from objectionable surface influences, but which at the same time indicates the influence of all deep-seated or deeply extending features that are sufficiently different in conductivity as compared with surrounding earth.

It is also seen that the procedure of the invention particularly permits the determination of the vertical extent of an ore body by studying the intensity of the indication. This is regarded as a very substantial improvement in the art of electrical prospecting.

We claim:

1. In a method of electrical prospecting, the steps which comprise flooding a profile of a tract under investigation with current supplied from one side of the profile, moving a ground current receiving net-work across the profile and taking readings from point to point, then flooding the profile with current supplied from the opposite side of the profile, and again moving the ground current receiving net-work across the profile and taking readings from point to point.

2. A method of electrical prospecting according to claim 1, which comprises plotting each series of readings to form a curve, and adding the two curves so plotted geometrically to form a resultant curve.

3. In a method of electrical prospecting the steps which comprise flooding a profile of a tract under investigation with current supplied from one side of the profile, moving a ground current receiving net-work across the profile and determining a series of potential drop ratios from point to point, then flooding the profile with current supplied from the opposite side of the profile, and again moving the ground current receiving network across the profile and determining another series of potential drop ratios from point to point.

4. A method of electrical prospecting according to claim 3, which comprises plotting each series of potential drop ratios to form a separate curve across the profile under investigation, and adding the two potential drop ratio curves so plotted geometrically to form a resultant curve.

5. In a method of electrical prospecting, the steps which comprise setting up an electric ground field in a tract to be investigated, said electric ground field being set-up by the passage of a current through at least two grounded power electrodes, one of said power electrodes being grounded remotely from a profile under observation, the other of said power electrodes being grounded sufficiently to one side of the profile so that ground fields set up within the profile are substantially un-affected by conductivity variations below said other power electrode, said power electrodes being grounded to one and the same side of the profile, moving a potential drop ratio ground current receiving net-work across the profile from point to point and determining a potential drop ratio for each said point, then reversing the procedure by grounding the power electrodes in a similar manner to the opposite side of the profile, and again moving the potential drop ratio ground current receiving net-work across the profile from point to point and determining a potential drop ratio for each said point.

6. A method of electrical prospecting according to claim 5, which comprises dividing each potential drop ratio by a normal potential drop ratio obtained over substantially homogeneous ground, plotting each series of corrected potential drop ratios to form a separate profile curve, and adding the two corrected potential drop ratio curves so plotted geometrically to form a resultant symmetry curve of the profile under investigation.

HANS T. F. LUNDBERG.
FOLKE H. KIHLSTEDT.